United States Patent [19]

Scholz et al.

[11] Patent Number: 5,408,371
[45] Date of Patent: Apr. 18, 1995

[54] MAGNETIC-TAPE CASSETTE APPARATUS WITH A DECK FOR PLAYING MAGNETIC-TAPE CASSETTES (GUIDANCE OF THE LOADING MECHANISM)

[75] Inventors: Thomas Scholz, Winkels; Stefan Koch, Hartenrod; Sieghard Post, Herborn-Guntersdorf, all of Germany

[73] Assignee: U.S. Philips Corporation, New York, N.Y.

[21] Appl. No.: 109,278

[22] Filed: Aug. 19, 1993

[30] Foreign Application Priority Data

Sep. 5, 1992 [DE] Germany .................. 42 29 754.0

[51] Int. Cl.$^6$ .......................................... G11B 15/675
[52] U.S. Cl. .................................................. 360/96.5
[58] Field of Search ...................... 360/96.5, 96.4, 92, 360/85, 95

[56] References Cited

U.S. PATENT DOCUMENTS

| | | | |
|---|---|---|---|
| 4,924,336 | 5/1990 | Klos-Hein et al. | 360/105 |
| 5,055,953 | 10/1991 | Tsuchiya | 360/96.5 |
| 5,103,357 | 4/1992 | Nakanishi | 360/96.5 |
| 5,189,573 | 2/1993 | Klos-Hein et al. | 360/85 |

FOREIGN PATENT DOCUMENTS

| | | | |
|---|---|---|---|
| 3914789 | 11/1990 | Germany | G11B 25/06 |
| 2072923 | 10/1981 | United Kingdom | 360/96.4 |

*Primary Examiner*—Robert S. Tupper
*Attorney, Agent, or Firm*—Norman N. Spain

[57] ABSTRACT

The invention relates to a magnetic-tape-cassette apparatus having a deck for playing magnetic-tape cassettes, which comprises a loading mechanism including a cassette holder (23) adapted to receive a magnetic-tape cassette (2) and having a holder wall (23e) which guides a cassette wall and which carries laterally projecting pins (23a/b), which pins are guided in lift slots (22b) in a lift slide (22), which slots are inclined relative to the vertical, to lower the cassette holder (23) into a play position and to lift the holder into an eject position, the lift slots (22b) being formed in a lift wall of the lift slide (22), which is movable between a forward and a backward end position, which carries along the cassette holder (23) over a part of its path of movement, and which is movably guided in a parallel first and a second rail (1f, 1n) on the deck plate of the apparatus, in which the first rail (1f) is arranged at the location of the lift wall provided with the lift slots (22b) through which the pins (23a/b) extend, the second rail (1n) is arranged underneath the lift slide (22) at a distance (A) from the first rail (1f), which distance is smaller than the width (B) of the magnetic-tape cassette (2) in a direction transverse to the longitudinal direction of the rail, at the location of the second rail (1n) the lift slide (22) has a lift member (22c) having the same inclination as the lift slots (22b), which lift member guides actuating projections (23h, 23k) of the cassette holder (23) in such a manner that at the location of the first (1f) and the second (1n) rail the holder can always be lowered and lifted to the same level.

10 Claims, 5 Drawing Sheets

MAGNETIC-TAPE CASSETTE APPARATUS WITH A DECK FOR PLAYING MAGNETIC-TAPE CASSETTES (GUIDANCE OF THE LOADING MECHANISM)

BACKGROUND OF THE INVENTION

The invention relates to a magnetic-tape-cassette apparatus having a deck for playing magnetic-tape cassettes, which comprises a loading mechanism including a cassette holder adapted to receive a magnetic-tape cassette and having a holder wall which guides a cassette wall and which carries laterally projecting pins, which pins are guided in lift slots in a lift slide, which slots are inclined relative to the vertical, to lower the cassette holder (23) into a play position and to lift said holder into an eject position, the lift slots being formed in a lift wall of the lift slide, which is movable between a forward and a backward end position, which carries along the cassette holder over a part of its path of movement, and which is movably guided in a parallel first and a second rail on the deck plate of the apparatus.

Such a magnetic-tape-cassette apparatus with a deck for playing magnetic-tape cassettes and having a cassette loading mechanism is known from DE 39 14 789 A1 which corresponds to U.S. Pat. No. 5,189,573. The cassette loading mechanism includes a lift slide which is guided on rails so as to be movable in the direction of insertion of the cassettes. The lift slide has a cassette holder which basically comprises two spaced-apart guide plates arranged one above the other in horizontal planes and interconnected by a vertical guide wall. The vertical guide wall carries outwardly projecting pins extending through lift slots in the lift slide. The lift slots are inclined relative to the vertical.

The cassette holder is lifted and lowered in a slot in an external supporting plate, through which the pins also extend. The cassette holder is moved up and down between a play position and an eject position by a relative movement between the lift slide and the cassette holder.

For a proper contact of the magnetic tape with the sound head it is necessary to pay special attention to the guidance of the cassette in the loading mechanism.

SUMMARY OF THE INVENTION

It is an object of the invention to provide a magnetic-tape-cassette apparatus of the type defined in the opening paragraph, in which the loading mechanism of the deck in a car radio having a limited space is guided so as to minimize the likelihood of canting.

According to the invention this object is achieved in that the first rail is arranged at the location of the lift wall provided with the lift slots through which the pins extend, the second rail is arranged underneath the lift slide at a distance from the first rail, which distance is smaller than the width of the magnetic-tape cassette in a direction transverse to the longitudinal direction of the rail, at the location of the second rail the lift slide has a lift member having the same inclination as the lift slots, which lift member guides actuating projections of the cassette holder in such a manner that at the location of the first and the second rail said holder can always be lowered and lifted to the same level.

Since the rails guiding the lift slide move towards one another the guidance of the lift slide and, as result, also of the cassette holder and the cassette situated in this holder is improved substantially.

In a further embodiment of the invention the distance between the rails is dimensioned to be smaller than the distance between the pins in the lift wall. This results in very favourable guidance conditions.

In addition to a correct guidance of the magnetic-tape cassette in the cassette holder and lift slide it is important that in the play mode the magnetic-tape cassette feeds the magnetic tape past the magnetic head exactly in the predetermined position. The height position then plays a significant role in view of a multi-track configuration of the magnetic head. In a further embodiment of the invention, in order to improve the position of the magnetic-tape cassette and the magnetic head relative to one another, the cassette holder has a bracket in the proximity of the magnetic head carried by a head support of the deck, which bracket is acted upon by the head support moving into the play position, in such a manner that the hold-down means urges the cassette holder into the play position in the proximity of the magnetic head via the bracket. Thus, a final adjustment of the magnetic-tape cassette and the magnetic head relative to one another in a direction perpendicular to the tape transport direction is effected regardless of the accurate guidance of the magnetic-tape cassette inside the cassette holder and the lift slide.

In a further embodiment of the invention the hold-down means comprises limbs interconnected by a toggle joint, the central axes of the limbs subtending an angle <180° in the disengaged position and being substantially aligned in the hold-down position. In this way the hold-down means can be disposed outside the lowering path of the cassette holder until the aligned rigid hold-down connection of the cassette holder has passed through the deck plate.

In a further embodiment of the invention the limbs are moved relative to one another via the toggle joint, which is moved by the head support. When the head support itself presses the joint into the hold-down position the rigid connection is also introduced into the lifting and lowering path of the cassette holder via the movement of the head support after lowering of the cassette holder and cassette.

BRIEF DESCRIPTION OF THE DRAWING

The invention will now be described in more detail with reference to the drawings. In the drawings.

DETAILED DESCRIPTION OF THE PREFERRED EMBODIMENT

Figure 1:
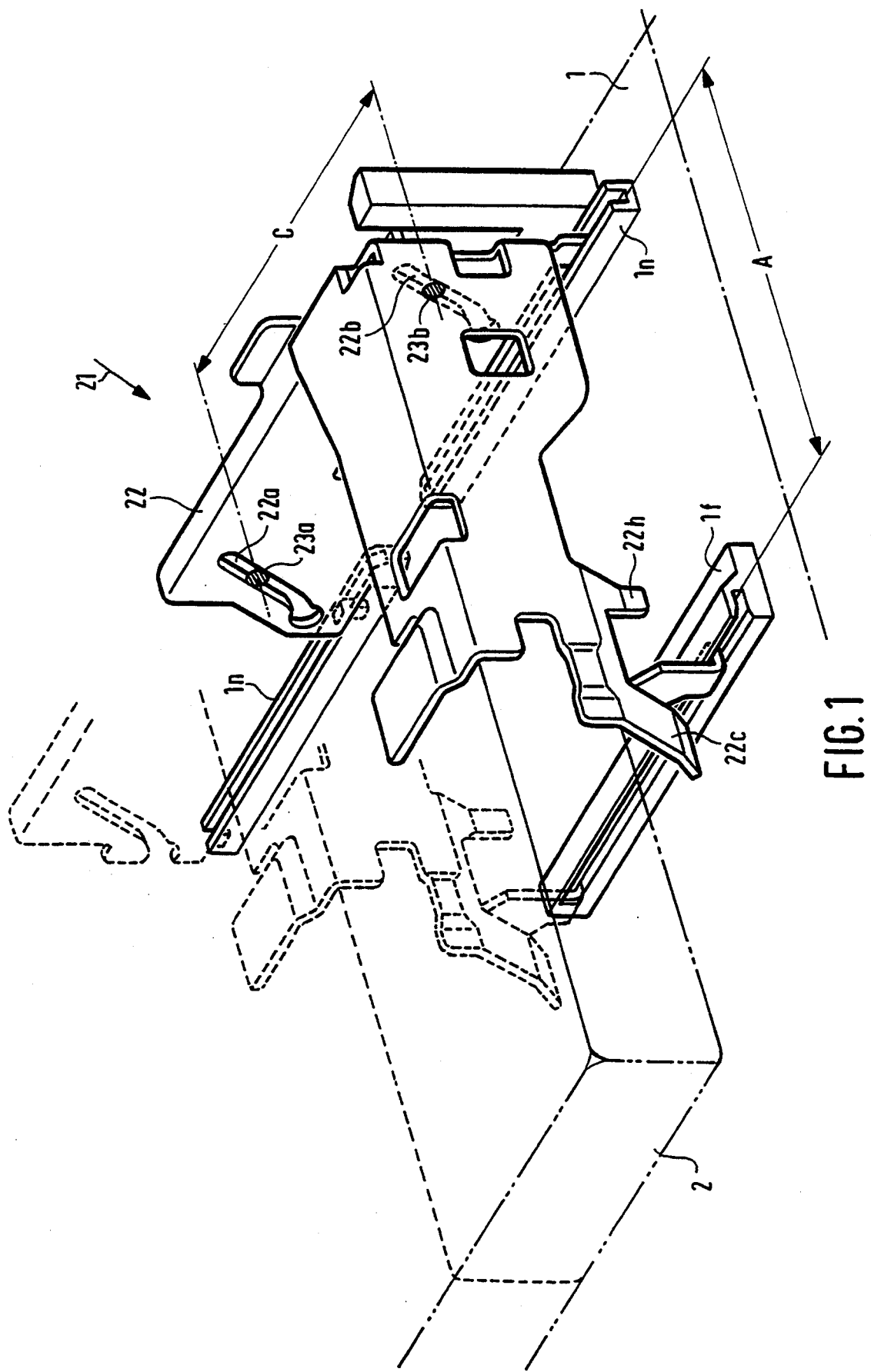
FIG. 1 diagrammatically shows a loading mechanism of a magnetic-tape-cassette apparatus in accordance with the invention with a lift slide and a magnetic-tape cassette in two different positions, the cassette holder being omitted.

The deck of the magnetic-tape-cassette apparatus has a loading mechanism 21, of which FIG. 1 shows only a lift slide 22 in two different positions. The position in broken-lines is the eject position and the position in solid lines is the end position of the lift slide in the play mode. The lift slide 22 contains a magnetic-tape cassette 2, which is shown diagrammatically, also in broken lines in the eject position and in solid lines in the play position but before it is lowered for playing. The lift slide 22 is arranged to be movable in rails 1f and 1n mounted on the deck plate 1. The distance A between these rails 1f and 1n approximates as closely as possible to the distance between the lift slots 22a 22b. As a result, the rail 1f is still situated underneath the magnetic-tape cassette. This minimizes the likelihood of canting of the lift slide and the cassette which is in fact guided therein.

Figure 2:
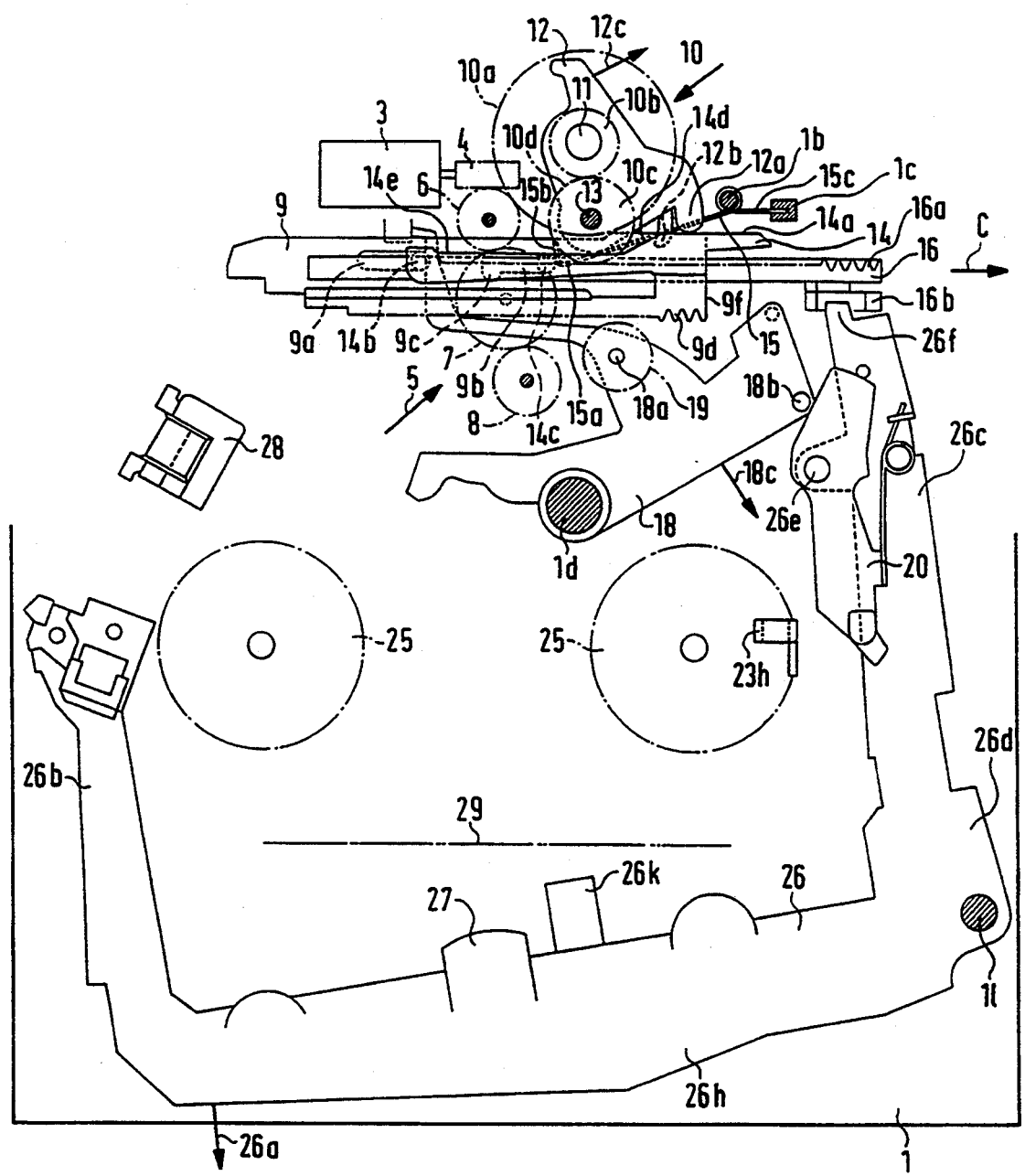
FIG. 2 shows a loading drive for the loading mechanism.

FIG. 2 shows loading mechanism in relation to its drive and the servo drive of the apparatus. The deck plate carries a winding motor 3, which drives a reel-drive mechanism 5 via a worm wheel 4, which reel-drive mechanism comprises a reduction gear wheel 6, a central gear wheel 7 and a transmission gear wheel 8. The reel-drive mechanism 5 is in operation as along as the winding motor 3 rotates.

A servo rod 9 is arranged on the deck plate 1, in a manner not shown, so as to be longitudinally movable.

A loading drive 10 comprises three gear wheels, i.e. a transport wheel 10a, an intermediate wheel 10b and a lift wheel 10c. The transport wheel 10a and the intermediate wheel 10b are rigidly coupled to one another by a spindle 11 which is supported on a pivotal lever 12. The pivotal lever 12 itself is pivotable about a spindle 13, about which the lift wheel 10c is also rotatable. The pivotal lever 12 is spring-loaded, in a manner not shown, in the direction indicated by an arrow 12c. The pivotal lever 12 has a control cam 12a adapted to follow a control profile 14a of a control rod 14. The control rod 14 is movably arranged on the servo rod 9. For this purpose the servo rod 9 has two guide slots 9a, 9b in which guide pins 14b and 14c are movable. The guide slot 9b has an L-shaped section 9c, in which the guide pin 14c is engageable, as will be described hereinafter. A stop spring 15 cooperates with the guide pin 14c and has a stop 15b at a free end 15a. The stop spring 15 is mounted on a pin 1b of the deck plate 1 and its spring arm 15c bears against an abutment 1c.

The control profile 14a of the control rod 14 has an inclined surface 14d as a transition to a deeper situated profile surface 14e. The reduction gear wheel 6 and the transport wheel 10a are not in mesh as long as the control cam 12a follows this control profile 14a.

The lift wheel 10c cooperates with a lift rack 16 which is movable in the longitudinal direction of the servo rod 9 and whose teeth 16a mesh with the teeth 10d of the lift wheel 10c. The lift rack 16 has an inclined surface 16b, which is clearly visible in FIG. 3 and which cooperates with an inclined actuating projection 23k. The inclination corresponds to the inclination of a lift slot 22b of a lift slide 22.

A switching member 18 is pivotable about a spindle 1d which is fixedly connected to the deck plate. The switching member 18 carries on a spindle 18a a servo wheel 19 adapted to cooperate with a toothed rack 9d of the servo rod 9. A spring, not shown, urges the switching member 18 in the direction indicated by an arrow 18c.

A latching lever 20 cooperates with an actuating pin 18b of the switching member 18. An actuating projection 23h of a cassette holder 23 can pivot the latching lever 20 about a fixed pin 26e on a head support 26 depending on the position of the lift slide 22.

Figure 3:
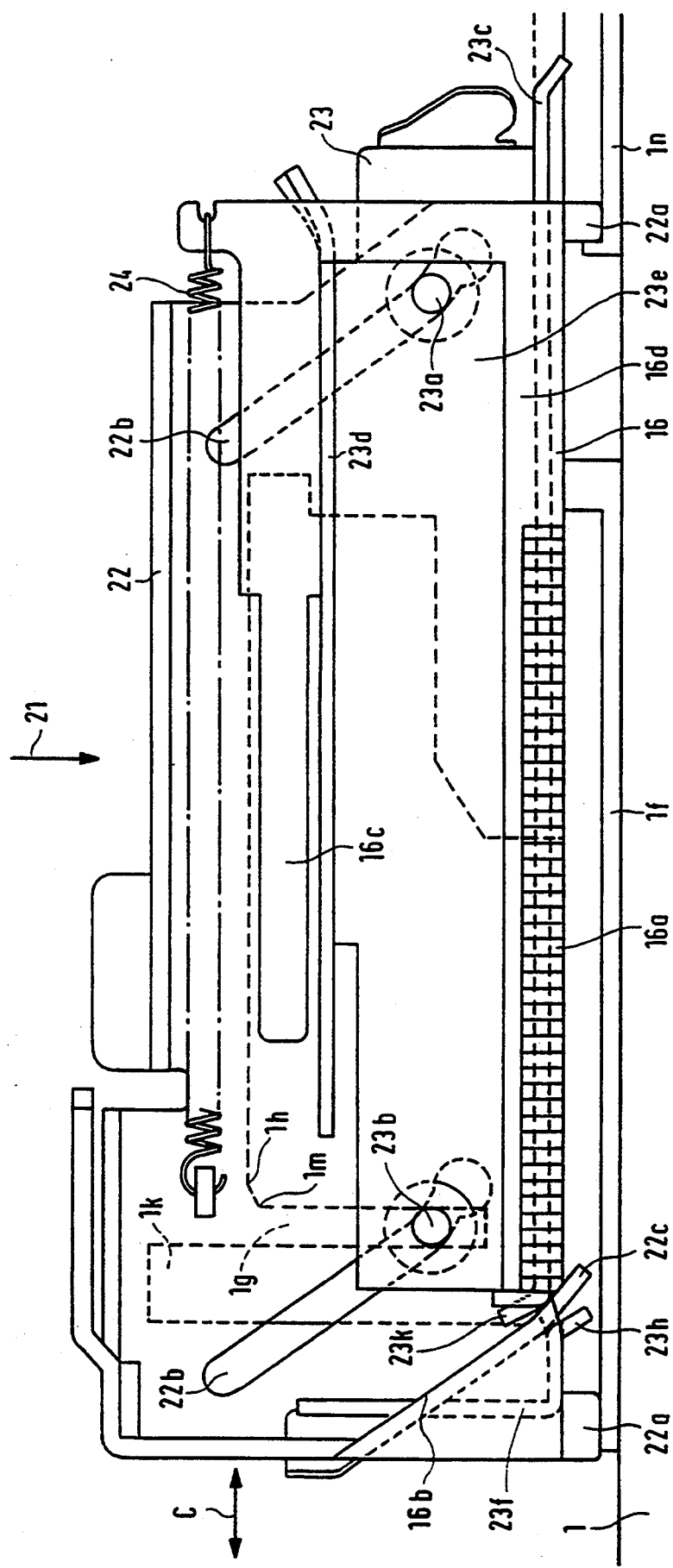
FIG. 3 is a side view of the loading mechanism.

FIG. 3 is a side view of the loading mechanism 21 of the deck. A lift slide 22 is guided in guide rails 1f and 1n of the deck plate 1 with feet 22a so as to be movable in the direction of the servo rod 9. The lift slots 22b of the lift slide 22 are inclined relative to the direction of movement indicated by an arrow C. These lift slots are engaged by pins 23a and 23b of the cassette holder 23. The pin 23b also engages a lowering slot 1g formed between a guide wall 1h and a bounding wall 1k.

The cassette holder 23 comprises a spaced-apart lower guide plate 23c and upper guide plate 23d, which are interconnected by a vertical connecting wall 23e, which is situated at the rear in the drawing and which carries the pins 23a and 23b. The cassette holder 23 also has a rearward stop wall 23f, against which a cassette inserted by hand can abut.

The cassette holder 23 has two actuating projections, i.e. the actuating projection 23h, which is also shown in FIG. 3, and the actuating projection 23k. Between the two projections the lift member 22c of the lift slide 22 is guided. Relative to the direction of insertion the lift member 22c has an inclination similar to that of the lift slots 22b.

The lift rack 16 is arranged on the lift slide 22 so as to be movable in the direction indicated by the arrow C. As is shown in the drawing the lift rack, which is of a U-type construction with two limbs 16c and 16d extending in the direction of movement C, carries on its lower limb 16d the toothed rack 16a, which cooperates with the lift wheel 10c. The lift rack 16 also has the inclined surface 16b shown in FIG. 1, which cooperates with the actuating projection 23h of the cassette holder 23.

The lift rack 16 is coupled to the lift slide 22 by means of a spring 24.

In the situation shown in FIG. 2 the actuating mechanism is in the eject position. The control cam 12a is then pressed against the control profile 14a, and the reduction wheel 6 is in mesh with the transport wheel 10a. The latching lever 20 is in contact with the actuating pin 18b but exerts no load on this pin because it is not actuated by the actuating projection 23h. The switching member 18 is disengaged from the transmission wheel 8, so that there is no contact between the toothed rack 9d and the drive. However, the toothed rack 16a is in mesh with the lift wheel 10c, so that it can be moved when the motor 3 rotates.

The actuating mechanism serves not only for driving the loading mechanism and the reel discs 25, as has been described in detail in DE 37 19 890 C1 (herewith incorporated by reference) which corresponds to U.S. Pat. No. 4,924,336. An additional function of the servo rod is to move the head support between a standby and a play position. As is shown in FIG. 2 the head support 26 is U-shaped an is pivotable against a spring load 26a about a pivot 11 at a corner 26d. The head support carries a magnetic head which cooperates with a magnetic tape 29 in a magnetic-tape cassette. The limb 26b of the head support 26, which arm is situated at the left in FIG. 2, cooperates with a holding magnet 28. The limb 26a of the head support 26, which arm is situated at the right in FIG. 2, has a stop 26f which cooperates with an edge 9f of the servo rod 9 in such a manner that the servo rod, which has been moved to the right, pivots the head support 26 clockwise via the stop 26f until it abuts against the holding magnet 28. During playing the holding magnet 28 holds the head support in this pivoted position, in which the magnetic tape is in contact with the magnetic head 27. The servo rod 9 returns by itself.

Figure 4:
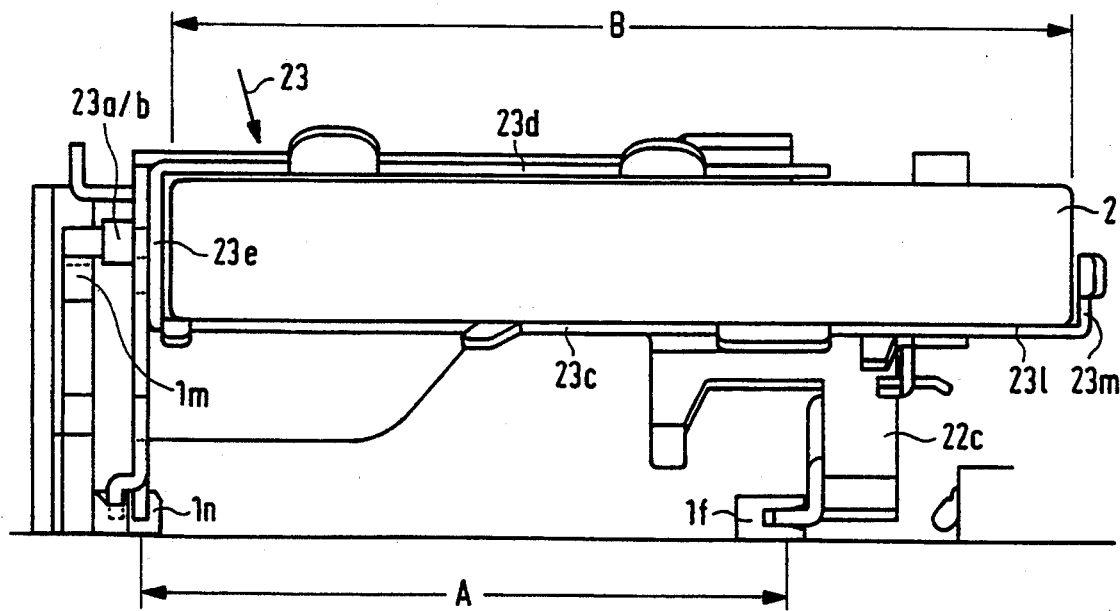
FIG. 4 shows the loading mechanism with a magnetic-tape cassette, cassette holder and lift slide in a front view with the magnetic-tape cassette in the lifted position.

FIG. 4 shows the loading mechanism in a front view with the cassette holder 23 lifted. The holder contains a magnetic-tape cassette 2. The cassette holder guides the magnetic-tape cassette 2 between the lower guide plate 23c the upper guide plate 23d. At the left of the cassette holder the vertical connecting wall 23e is visible, which carries the pins 23a and 23b. At the right a bounding wall 23m bounds a cassette compartment 23l. In the situation shown in FIG. 4 the pins 23a and 23b extend beyond the wall 1m.

The rails 1f and 1n are spaced at a distance A from one another and it is visible that this distance is distinctly smaller than the width B of the magnetic-tape cassette and of the cassette holder. Consequently, the rail 1f extends underneath the cassette holder 23 and the cassette 2. At the right-hand side of the cassette holder 23 the lift member 22c gives the support provided at the left by the pins 23a/b.

Figure 5:
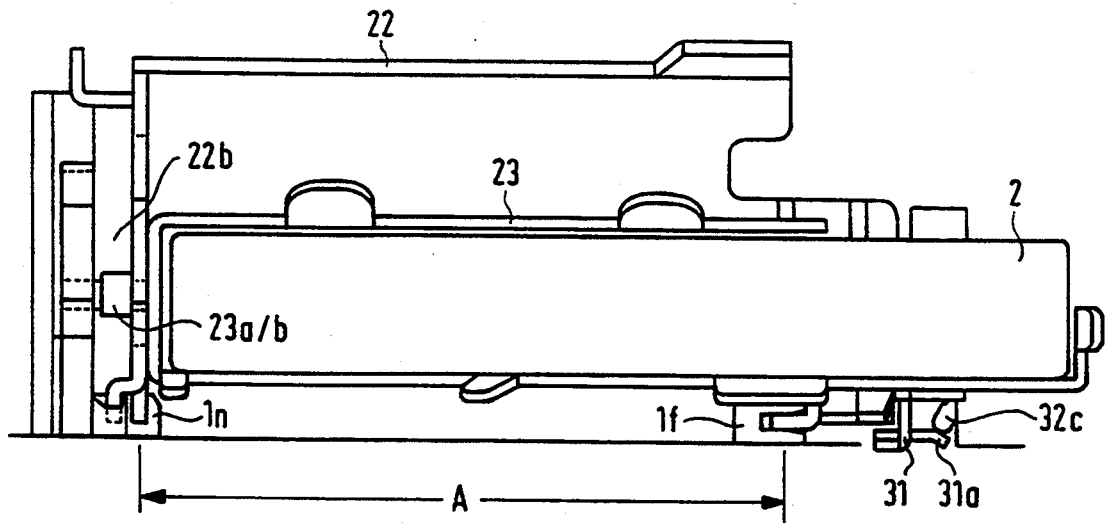
FIG. 5 shows the arrangement shown in FIG. 4 with the magnetic-tape cassette in the lowered position.

FIG. 5 shows the cassette holder 23 lowered in the lift slide 22. The cassette holder again holds the cassette 2. The pins 23a/b have moved downward in the lift slots 22b. At the same time the actuating projections 23h and 23k have slid down along the lift member 22c.

Figure 6:
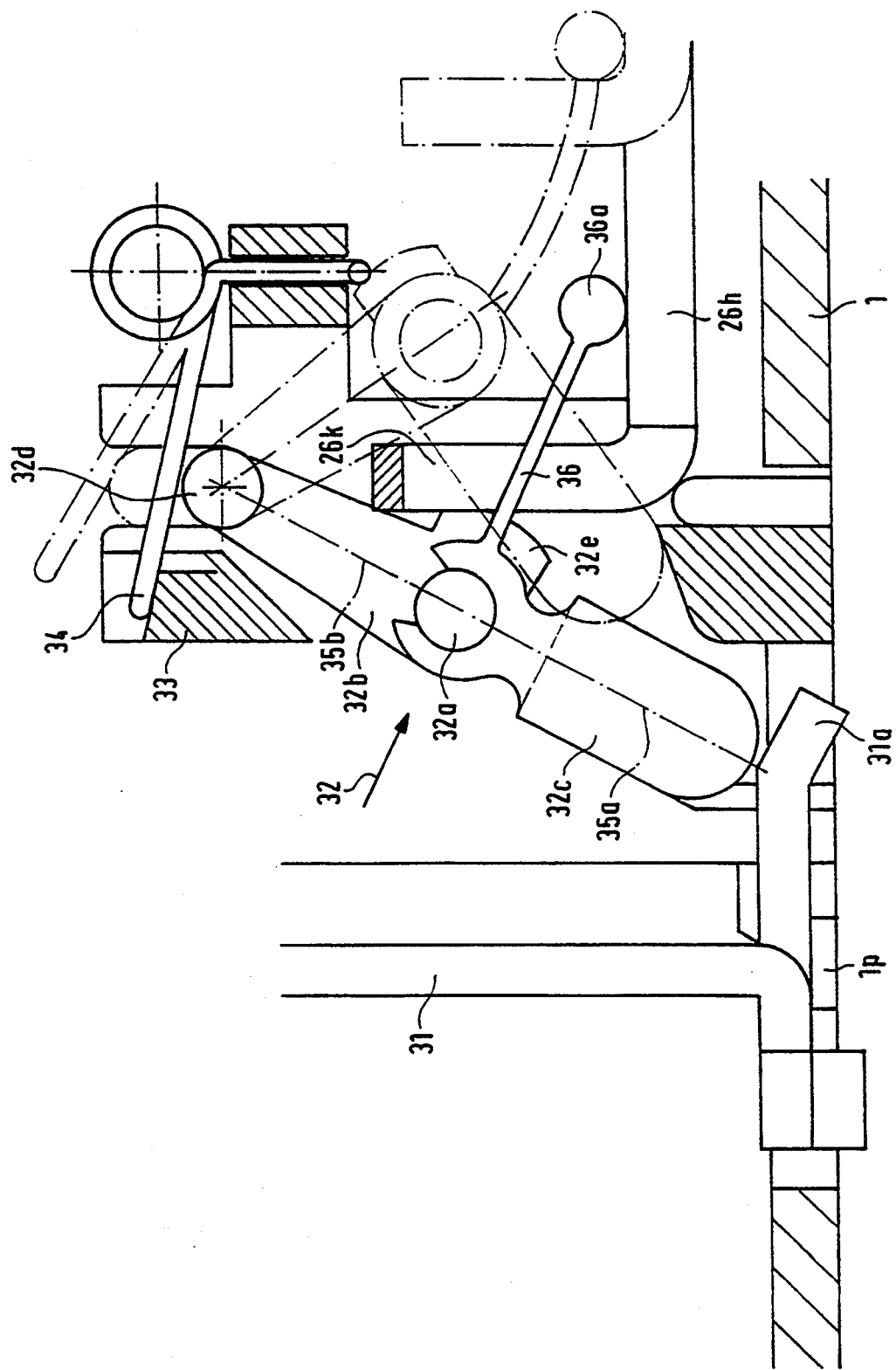
FIG. 6 shows the hold-down mechanism in the proximity of the magnetic head.

As is shown in FIG. 6, the cassette holder 23 carries a bracket 31, which is situated in the direct proximity of the magnetic head 27 when the cassette holder 23 has been lowered. The bracket 31 has a downwardly bent arm 31a which points towards the base 26h of the head support and which cooperates with a hold-down means 32. The hold-down means 32 is guided in a supporting device 33. The hold-down means comprises two limbs 32b, 32c interconnected by a toggle joint 32a. The limb 32c carries a pressure pin 32d, which is urged towards the deck plate 1 by a leg spring 34. When the head support 26 has been set to the play position a pressure member 26k presses against a projection 32e of the limb 32b. As a result, the hold-down means 32 is pressed into a hold-down position in which the central axes 35a and 35b of the limbs 32c and 32b are aligned. The spring 34 presses the limb 32c against the arm 31a and thus pulls the cassette holder 23 against a seat 1p on the deck plate 1 in the proximity of the magnetic head. This results in the position of the cassette holder 23 in the proximity of the magnetic head 27 being accurately defined.

If the head support 26 with its pressure member 26k returns to the standby position the hold-down means 32 will spring back into the dash-dotted position. The arm 31a is now disengaged and the holder can move upwards past the limb 32c to eject the cassette.

At the location of the toggle joint 32a the limb 32c has been provided with a flexible plastics spring 36. This flexible plastics spring ensures that the hold-down means 32 is pulled back into the dashed position by means of a head portion 36a when the head support returns.

We claim:

1. A magnetic-tape cassette apparatus having a deck for playing magnetic-tape cassettes, said cassettes having top, bottom and side walls, which apparatus has a loading mechanism having a cassette holder adapted to receive a magnetic-tape cassette and a lift slide having a lift wall in engagement with said cassette holder, said cassette holder having a holder wall which guides a wall of the cassette and which carries laterally projecting pins, which pins are guided in lift slots in the lift slide, the cassette holder also having activating projections, the lift slots of the lift slide being inclined relative to the vertical, to lower the cassette holder into a play position and to lift said cassette holder into an eject position, the lift slide is movable between a forward and a backward end position, which carries along the cassette holder over a part of its path of movement, and parallel first and a second rails mounted on the apparatus, wherein the improvement comprises the first rail is arranged at the location of the lift wall provided with the lift slots through which the laterally projecting pins extend, the second rail is arranged underneath the lift slide at a distance (A) from the first rail, which distance is smaller than the width (B) of the magnetic-tape cassette in a direction transverse to the longitudinal direction of the rail, at the location of the second rail the lift slide has a lift member having the same inclination as the lift slots, which lift member cooperates with the actuating projections of the cassette holder in such a manner that, at the location of the first and the second rail, said cassette holder can repeatedly be lowered and lifted to the same level.

2. A magnetic-tape-cassette apparatus as claimed in claim 1 wherein the distance (A) between the first and second rails is dimensioned to be smaller than the distance (C) between the laterally projecting pins in the lift wall.

3. A magnetic-tape-cassette apparatus as claimed in claim 1, wherein the apparatus includes a magnetic head carried by a head support and a hold down means for the cassette holder, the cassette holder having a bracket in the proximity of the magnetic head carried by the head support, which bracket is acted upon by the head support moving into the play position, in such a manner that the hold-down means urges the cassette holder into the play position in the proximity of the magnetic head by means of the bracket.

4. A magnetic-tape-cassette apparatus as claimed in claim 3, wherein the hold-down means comprises limbs interconnected by a toggle joint, the central axes of the limbs subtending an angle <180° when the hold-down means is disengaged from the cassette holder and being substantially aligned in when the hold-down means engages the cassette holder.

5. A magnetic-tape-cassette apparatus as claimed in claim 4, wherein the limbs of the hold-down means are moved relative to one another via the toggle joint, which is moved by the head support.

6. A loading mechanism for a magnetic-tape-cassette apparatus comprising:

a cassette holder for receiving a magnetic-tape-cassette, said cassette holder having a holder wall for engaging a wall of a magnetic-tape-cassette, said wall having laterally projecting pins;

a lift slide, which is movable between a forward and a backward end position, said lift slide including a lift wall having lift slots disposed therein which are inclined to the vertical, the laterally projecting pins of said cassette holder being guided in the lift slots of said lift slide;

parallel first and second guide rails for guiding said lift slide, the first guide rail being disposed proximate said lift wall of said lift slide, the second rail being disposed beneath said lift slide and being spaced apart from said first guide rail a distance which is less than the width of the cassette in a direction transverse to the direction of the guide rails;

a lift member mounted to said lift slide proximate to the location of the second guide rail and having an inclination similar to that of said lift slide; and actuating projections mounted to said cassette holder and in cooperation with said lift member to locate said cassette holder with respect to said lift slide.

7. The magnetic-tape-cassette apparatus as claimed in claim 6 wherein the distance between the first and second guide rails is smaller than the distance between the laterally projecting pins of said cassette holder.

8. The magnetic-tape-cassette apparatus as claimed in claim 6 wherein the apparatus further includes a magnetic head movably carried by a head support means and a hold-down means for the cassette holder, the cassette holder having a bracket in the proximity of the magnetic head which is acted upon by the head support means moving the magnetic head into a play position.

9. The magnetic-tape-cassette apparatus as claimed in claim 7 wherein the hold-down means comprises first and second articulated limbs interconnected by a toggle joint, the limbs subtending an angle $<180°$ when the hold-down means is disengaged from the cassette holder and being substantially aligned when the hold-down means is in engagement with the cassette holder.

10. The magnetic-tape-cassette apparatus as claimed in claim 9 wherein the first and second limbs of the hold-down means are moved by means of the toggle joint which in turn is moved by the head support means.

* * * * *